United States Patent [19]

Baur

[11] Patent Number: 4,706,154
[45] Date of Patent: Nov. 10, 1987

[54] CIRCUIT ARRANGEMENT FOR PROTECTING A CRT AND ASSOCIATED CIRCUITRY FROM DAMAGE DUE TO ARCING

[75] Inventor: Bruce K. Baur, Milwaukie, Oreg.

[73] Assignee: Tektronix, Inc., Beaverton, Oreg.

[21] Appl. No.: 798,658

[22] Filed: Nov. 15, 1985

[51] Int. Cl.$^4$ .............................................. H02H 9/04
[52] U.S. Cl. ......................................... 361/56; 315/3; 361/2
[58] Field of Search .............................. 361/2, 10–12, 361/54, 56; 315/3, 349, 379

[56] References Cited

U.S. PATENT DOCUMENTS 3,934,175  1/1976  Clark .................................... 361/118
3,965,393  6/1976  Chamberlain ........................ 361/56

Primary Examiner—A. D. Pellinen
Assistant Examiner—Jeffrey A. Gaffin
Attorney, Agent, or Firm—John D. Winkelman; John Smith-Hill

[57] ABSTRACT

A silicon controlled rectifier (SCR) is connected between a selected electrode of a CRT and a reference potential level that is negative relative to the selected CRT electrode. The SCR remains non-conductive so long as the voltage between the selected electrode and the reference potential level remains below the breakdown voltage of the SCR and the SCR's dv/dt rating is not exceeded. If the voltage between the electrode and the reference potential level increases at a rate that exceeds the threshold rate for the SCR, the SCR turns on and shorts the selected electrode to the reference potential level.

7 Claims, 1 Drawing Figure

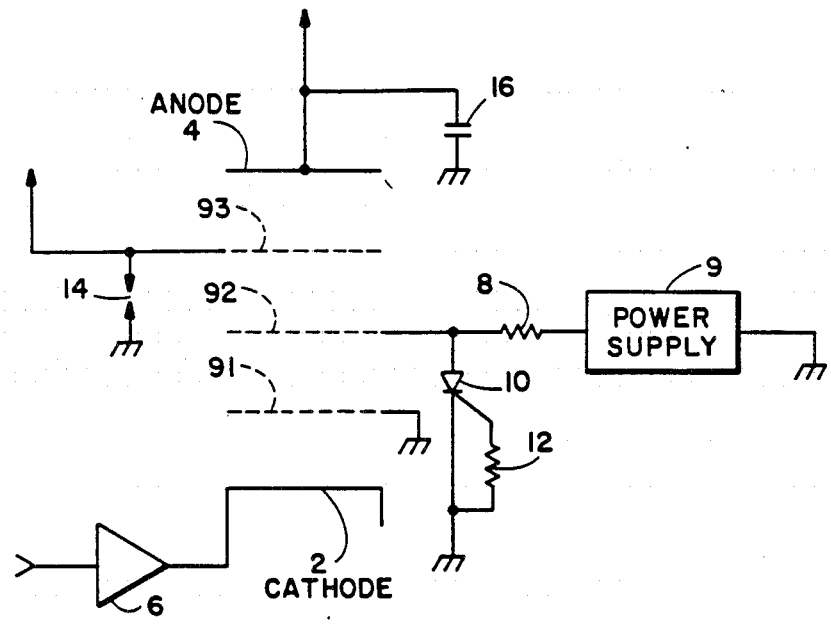

CIRCUIT ARRANGEMENT FOR PROTECTING A CRT AND ASSOCIATED CIRCUITRY FROM DAMAGE DUE TO ARCING

This invention relates to a circuit arrangement for protecting a cathode-ray tube (CRT) and associated circuitry from damage due to arcing between the electrodes of the CRT.

BACKGROUND OF THE INVENTION

A conventional cathode-ray tube normally comprises, between the cathode and the anode, three grids that are commonly known as G1, G2, and G3. Either the cathode or the grid G1 is effectively grounded, the CRT's video amplifier being connected to whichever of these two electrodes is not grounded, and the potential difference between the cathode and the grid G1 determines the beam current of the CRT. The grid G2 is maintained at a potential of about 200 to 800 volts, which is adjusted to establish a beam current cut-off point with a given G1 to cathode voltage. The focus grid G3 is normally maintained at a potential of about 6 kv, whereas the anode is maintained at a potential of about 25 kv. There is usually a capacitance associated with the anode that stores a substantial amount of energy. This capacitance may be the dag capacitance due to the CRT's external conductive coating, or it may be a filter capacitance in the power supply.

It is essential to proper operation of a CRT that the beam current should remain below a limiting value, since a very high beam current may result in burning of the CRT phosphor if the point of incidence of the electron beam on the phosphor remains stationary or moves at a low velocity.

Every CRT has the potential to arc via high voltage breakdown between the internal elements of the CRT. This breakdown is usually initiated by sharp burrs on the gun elements or loose particles within the CRT. The arc usually starts between G3 and the anode, where the highest potential difference exists. Normally, the arc then propagates down the CRT to G2. The G2 circuitry is usually of quite high impedance. Therefore, when the arc reaches G2 the voltage level of G2 goes very high, turning the beam on very hard. The arc can then propagate to G1 and the cathode. This may result in destruction of the video amplifier or the cathode itself.

The energy dissipated in the arc is usually quite high because of the charge stored on the capacitance associated with the anode. The currents generated by the arc have very short rise times, and the voltage rise times of elements connected to a high impedance are very high also (normally greater than 500 kv/$\mu$s).

It is conventional to use a spark gap to help limit the voltage excursions at different CRT elements. A spark gap comprises two spaced apart electrodes. When a voltage exceeding a threshold voltage is applied to the electrodes of the spark gap, an arc will occur in the spark gap. In use of a spark gap to protect a CRT and associated circuitry, the spark gap is connected between a selected electrode, other than the anode, and a reference potential level, e.g. ground. When an arc forms, the voltage on the selected electrode of the CRT increases, increasing the voltage across the spark gap. When the voltage across the spark gap exceeds the threshold value, the spark gap fires and establishes a low resistance path between the selected electrode and ground, and the energy stored in the capacitance associated with the anode is shunted to ground. However, ionization of the gas in the spark gap path does not take place instantaneously, and there might be a significant delay between onset on a high voltage condition and firing of the spark gap. The length of the delay depends upon the magnitude of the potential difference, and the gap voltage can exceed the rated firing voltage of the spark gap for a short period of time without the spark gap's firing. This time may be sufficient for the arc to cascade down the CRT from one electrode to the next, and to cause large, fast voltage transitions to occur on these electrodes, possibly damaging the electrodes and circuitry connected to the electrodes.

A silicon controlled rectifier (SCR) is a semiconductor device having an anode, a cathode and a gate. In its normal mode of operation, the SCR is turned on (rendered conductive) by applying a small current to its gate, and the SCR remains conductive so long as the current flowing from its anode to its cathode remains above a holding value. An SCR will also be turned on if the potential difference between its anode and cathodes is increased at an excessive rate. For example, the Motorola 2N6241 has a dv/dt rating of 10 v/$\mu$s (typical). It is generally accepted that the dv/dt rating of an SCR is a warning to the circuit designer to ensure that the SCR will not be exposed to potential differences changing at a rate greater than the quoted rating, since otherwise the SCR will be turned on otherwise than in response to a signal applied to its gate.

SUMMARY OF THE INVENTION

In a preferred embodiment of the present invention, a silicon controlled rectifier (SCR) is connected between a selected electrode of a CRT and a reference potential level that is negative relative to the selected CRT electrode. The SCR remains non-conductive so long as the voltage between the selected electrode and the reference potential level remains below the breakdown voltage of the SCR and the SCR's dv/dt rating is not exceeded. If the voltage between the electrode and the reference potential level increases at a rate that exceeds the threshold rate for the SCR, the SCR turns on and shorts the selected electrode to the reference potential level.

BRIEF DESCRIPTION OF THE DRAWING

For a better understanding of the invention, and to show how the same may be carried into effect, reference will now be made, by way of example, to the accompanying drawing, the single FIGURE of which illustrates diagrammatically a CRT apparatus embodying the present invention.

DETAILED DESCRIPTION

The CRT shown in FIG. 1 comprises a cathode 2, grids G1, G2 and G3, and an anode 4. The grid G1 is grounded. The cathode 2 is maintained at a DC potential of about +60 volts, and receives a beam intensity modulation signal by way of a video amplifier 6. The grid G2 is connected through a resistor 8 to a power supply 9 having a potential of 200 to 800 volts, and is connected to ground through an SCR 10. The power supply 9 is of the kind that shuts down automatically when its load is short-circuited. Alternatively, the power supply 9 may be designed so that the current that it can supply through the resistor 8 is smaller than the holding current of the SCR. A resistor 12 is connected between the gate and the cathode of the SCR. The focus grid G3 is connected to a power supply having a voltage potential of about 6 kv, whereas the anode 4 is connected to a power supply having a voltage potential of about 25 kv. A dag or filter capacitance 16 of about 2000 pF is connected between the anode 4 and ground. A spark gap 14 is connected between the focus electrode and ground.

In the event that an arc is established between the anode and the focus grid G3 and propagates to the grid G2, the current flowing through the resistor 8 will cause the voltage of the grid G2 to rise rapidly. This rapid rise exceeds the dv/dt threshold of the SCR 10, causing the SCR to turn on very rapidly (much more rapidly than a spark gap). The grid G2 is thus shorted to ground and the beam current is therefore extinquished. In the event that the power supply 9 is of the kind that shuts down automatically on overload, the power supply shuts down when the grid G2 is shorted to ground, and therefore when the arc is extinguished the SCR is deprived of holding current and turns off. The power supply must be turned on again in order to restore the voltage of the grid G2 to its normal operating value. If the output current of the power supply 9 is less than the holding current of the SCR, the SCR turns off when the arc is extinguished without the power supply's turning off, and therefore when the arc is extinguished the circuit is automatically reset without there being any need for operator intervention. In either case, shorting the grid G2 to ground results in the potential difference between the grid G2 and the grid G1 being made quite small, so that propagation of the arc to the grid G1 and the cathode 2 is inhibited. This protects both the cathode 2 and the video amplifier 6.

It will be appreciated that the present invention is not restricted to the particular arrangement that has been shown and described, and that variations may be made therein without departing from the scope of the invention as defined in the appended claims, and equivalents thereof. For example, although presently-available SCRs have voltage ratings of around 1 kv, and therefore they are not suitable for connection between the focus grid G3 and ground in view of the high potential of the focus grid, there is no reason in principle why, if an SCR with a suitable voltage rating were available, it should not be used in place of the spark gap 14.

What is claimed is:

1. In cathode-ray tube apparatus that includes a cathode-ray tube having an anode, a cathode, and at least one grid electrode intermediate said anode and cathode, means for protecting said tube and its associated circuitry from damage caused by interelectrode arcing, comprising
    a silicon controlled rectifier connected between said grid electrode and a common reference potential, said rectifier as thus connected being nonconductive during normal operation of said apparatus but becoming conductive when the potential difference between said grid and reference potential increases at a rate exceeding the established dv/dt rating for said rectifier.

2. The cathode-ray tube apparatus of claim 1, wherein said means further includes a resistor connected between the gate of said rectifier and said reference potential.

3. The cathode-ray tube apparatus of claim 1, wherein said grid electrode is a G2 grid of said cathode-ray tube.

4. The cathode-ray tube apparatus of claim 1, wherein said grid electrode is connected through a resistor to power supply means for maintaining the grid electrode at a potential of at least about 200 volts above said reference potential.

5. An electron discharge tube provided with means for suppressing internal arcing,
    said tube having a cathode, an anode, and at least one grid electrode disposed intermediate said cathode and anode,
    said suppressing means comprising a semiconductor device having an anode and a cathode connected respectively between said grid electrode and a reference potential, said device having the property of spontaneously switching rapidly from a nonconducting to a conducting state when the rate of change of a voltage potential applied across its anode and cathode exceeds a certain value,
    said device being nonconducting during normal operation of the said tube.

6. The electron discharge tube of claim 5, wherein said semiconductor device is a silicon controlled rectifier.

7. In cathode-ray tube apparatus that includes a cathode-ray tube having an anode, a cathode, a G2 grid and a focus grid intermediate said G2 grid and anode, means for protecting said tube and it associated circuitry from damage caused by interelectrode arcing, comprising
    a silicon controlled rectifier having its anode connected to said G2 grid and its cathode connected to a reference potential, and
    a spark gap connected between said focus grid and said reference potential.

* * * * *